US012633015B2

(12) United States Patent (10) Patent No.: US 12,633,015 B2

Ito (45) Date of Patent: May 19, 2026

(54) IMAGE PROCESSING APPARATUS FOR GENERATING A BACKGROUND IMAGE, IMAGE PROCESSING METHOD, AND STORAGE MEDIUM

(71) Applicant: CANON KABUSHIKI KAISHA, Tokyo (JP)

(72) Inventor: Hidenori Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 18/589,468

(22) Filed: Feb. 28, 2024

(65) Prior Publication Data

US 2024/0303885 A1 Sep. 12, 2024

(30) Foreign Application Priority Data

Mar. 6, 2023 (JP) ................................. 2023-033506

(51) Int. Cl.
*G06T 11/60* (2026.01)
*G06T 7/20* (2017.01)
(Continued)

(52) U.S. Cl.
CPC ................ *G06T 11/60* (2013.01); *G06T 7/20* (2013.01); *G06V 10/25* (2022.01); *G06V 10/751* (2022.01);
(Continued)

(58) Field of Classification Search
None
See application file for complete search history.

(56) References Cited

U.S. PATENT DOCUMENTS 5,963,272 A * 10/1999 Wixson .................... G08G 1/07
348/700
10,863,113 B2 * 12/2020 Matsui ................... H04N 5/144
(Continued)

FOREIGN PATENT DOCUMENTS

JP 2000-285244 A 10/2000
JP 2001-043383 A 2/2001
(Continued)

OTHER PUBLICATIONS

Notice of Reasons for Refusal issued by the Japanese Patent Office on Jan. 21, 2025 in corresponding JP Patent Application No. 2023-033506, with English translation.

*Primary Examiner* — Jason A Pringle-Parker
(74) *Attorney, Agent, or Firm* — Carter, DeLuca & Farrell LLP

(57) ABSTRACT

In a case where a background image is generated from a plurality of captured images obtained during a predetermined time, on a condition that an object at rest exists, the object is taken in in the background image. A new background image is generated by performing updating processing based on the plurality of captured images, which takes an updating area identified by area information among generated background images corresponding to the plurality of captured images obtained during a predetermined time as a target. The area information is information indicating an updating area, which is a target of updating processing, and a non-updating area, which is not a target of updating processing, in the background image.

15 Claims, 8 Drawing Sheets

(51) Int. Cl.
    *G06V 10/25*         (2022.01)
    *G06V 10/75*         (2022.01)
    *G06V 10/764*       (2022.01)

(52) U.S. Cl.
    CPC ........ *G06V 10/764* (2022.01); *G06V 2201/07*
                           (2022.01)

(56) References Cited

U.S. PATENT DOCUMENTS

| | | | |
|---|---|---|---|
| 11,776,213 B2 | 10/2023 | Ito | |
| 11,869,196 B2 | 1/2024 | Ito | |
| 2007/0183661 A1* | 8/2007 | El-Maleh | G06V 40/162 |
| | | | 382/173 |
| 2014/0056519 A1* | 2/2014 | Gupta | G06T 7/174 |
| | | | 382/173 |
| 2016/0171332 A1* | 6/2016 | Kawano | H04N 5/272 |
| | | | 382/173 |
| 2016/0210756 A1* | 7/2016 | Konishi | G06T 7/194 |
| 2017/0116750 A1* | 4/2017 | Pond | G06T 7/38 |
| 2019/0236791 A1* | 8/2019 | Matsui | G06T 7/254 |
| 2020/0193611 A1* | 6/2020 | Morrison | G06V 20/52 |

FOREIGN PATENT DOCUMENTS

| | | |
|---|---|---|
| JP | 2001-043458 A | 2/2001 |
| JP | 2004-046501 A | 2/2004 |
| JP | 2009-071857 A | 4/2009 |
| JP | 2019-134269 A | 8/2019 |
| JP | 2021-163303 A | 10/2021 |

* cited by examiner

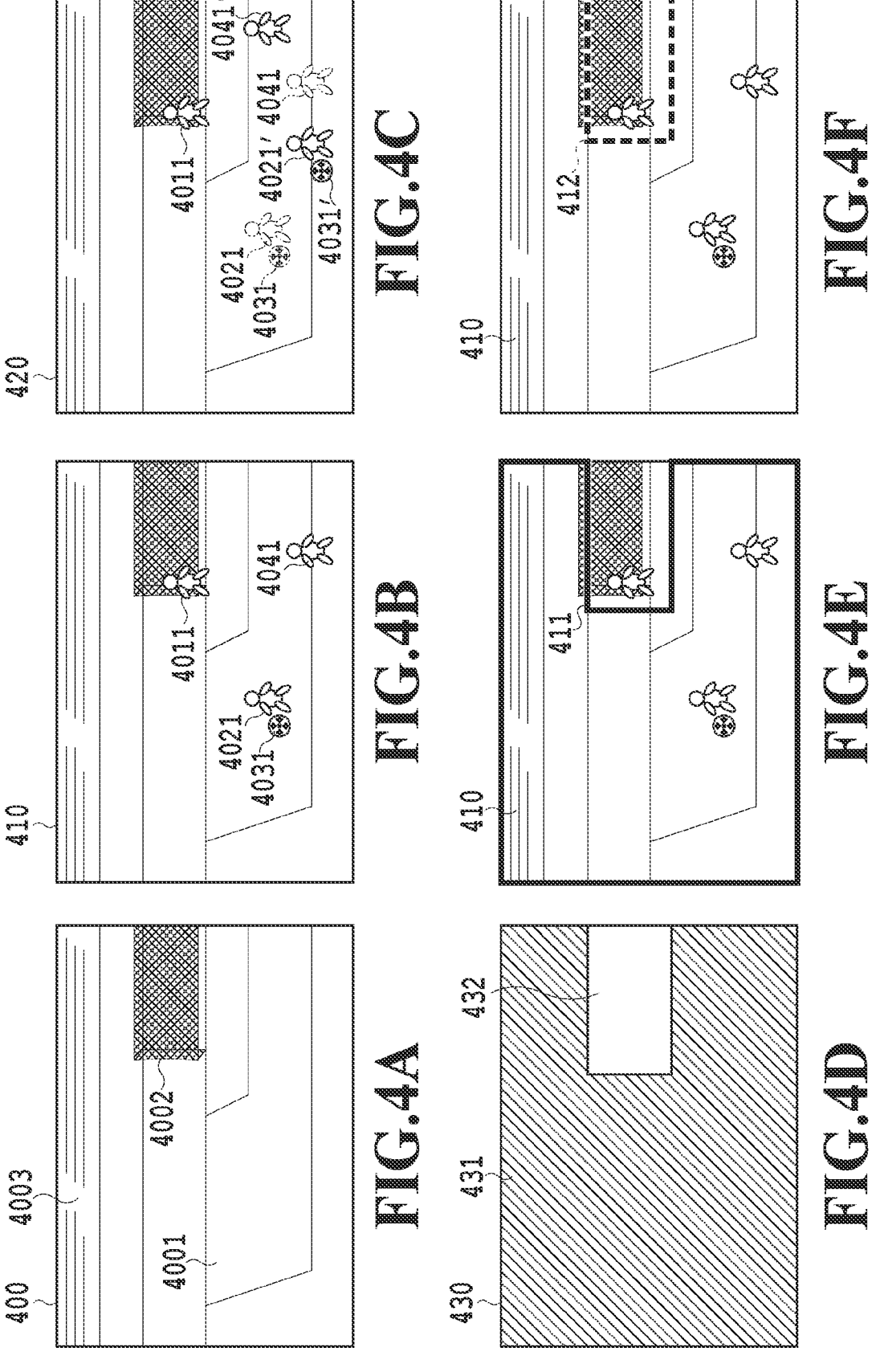

IMAGE PROCESSING APPARATUS FOR GENERATING A BACKGROUND IMAGE, IMAGE PROCESSING METHOD, AND STORAGE MEDIUM

BACKGROUND

Field

The present disclosure relates to a technique to generate a background image obtained by removing a foreground from a captured image.

Description of the Related Art

There exists a large number of use cases where it is desired to faithfully extract and separate only an object of interest from a captured image. As one example thereof, there is a use case where a virtual viewpoint image is generated. A virtual viewpoint image is obtained by generating data (3D model) representing a three-dimensional shape of an object by using a plurality of captured images obtained by a plurality of different imaging devices performing synchronous image capturing and by capturing the 3D model by an imaging device (virtual camera) arranged virtually in an image capturing space. In a case where a virtual viewpoint image is generated as described above, in order to faithfully reproduce the 3D model of an object, it is necessary to separate the area of the object captured in each captured image along the contour of the area from the background with accuracy.

As one of methods used for this separation, there is a background difference method, in which a background image in which no object exists (that is, only the background is captured) and a captured image in which an object exists (that is, the foreground and the background are captured) are compared, and a difference between both images is extracted. In order to perform the background difference method, the background image is necessary, but in a case where the object exists at all times within the viewing angle of the imaging device, it is not possible to use the captured image in a certain instant as the background image, and therefore, the background image is generated by combining a plurality of captured images obtained during a predetermined time.

Here, by the generation method disclosed in Japanese Patent Laid-Open No. 2001-43458, first, the absolute value of the difference between the captured image at a certain time and the captured image at the time one time before the certain time is binarized and a mask image is created in which the value of the pixel for which a change is detected is taken to be "0" and the value of the pixel for which no change is detected is taken to be "1". Then, for the pixel for which no change is detected, the value of the count buffer is increased by one count and for the pixel for which a change is detected, the value of the count buffer is reset to "0". As a result of that, in a case where the value of the count buffer is larger than a threshold value, the pixel value of the captured image at the time is copied to the background image, and thereby, the background image is updated.

With the method disclosed in Japanese Patent Laid-Open No. 2001-43458 described above, in a case where a predetermined time elapses without any change in the state where an object desired to be extracted as a foreground remains at rest, the position at which the object is captured does not change throughout a plurality of captured images obtained during the predetermined time. As a result of that, the area of the object is taken in in the background image. In this case, it is no longer possible to separate and extract the area of the object as the foreground from the captured image and subsequent captured images.

SUMMARY

The image processing apparatus according to the present disclosure is an image processing apparatus for generating a background image from a plurality of captured images obtained during a predetermined time and includes: one or more memories storing instructions; and one or more processors executing the instructions to perform: obtaining the plurality of captured images; obtaining area information indicating an updating area, which is a target of updating processing, and a non-updating area, which is not a target of updating processing, for the background image; and generating a new background image by performing updating processing based on the plurality of captured images, which takes the updating area identified by the area information among the generated background images corresponding to the plurality of captured images as a target.

Further features of the present disclosure will become apparent from the following description of exemplary embodiments with reference to the attached drawings.

BRIEF DESCRIPTION OF THE DRAWINGS

FIG. 4A to FIG. 4F are diagrams explaining a generation method of a background image in the first embodiment;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Apparatus Configuration>

Figure 1:
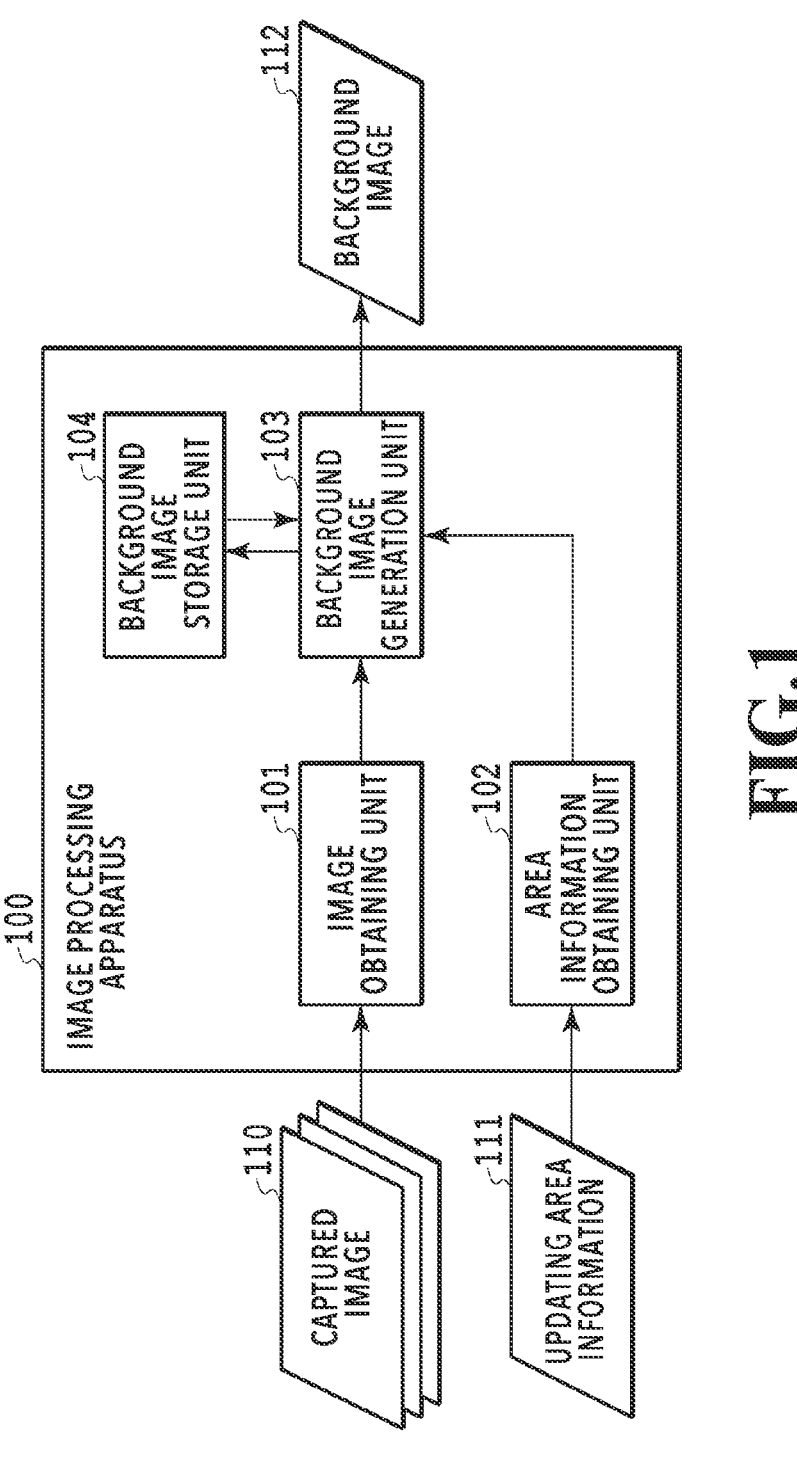
FIG. 1 is a diagram showing a logical configuration of an image processing apparatus generating a background image.

FIG. 1 is diagram showing a logical configuration (function configuration) of an image processing apparatus 100 generating a background image according to the present embodiment. The image processing apparatus 100 has an image obtaining unit 101, an area information obtaining unit 102, a background image generation unit 103, and a background image storage unit 104. The image processing apparatus 100 generates and updates a background image by taking a plurality of captured images 110 captured during a predetermined time by one and the same imaging device (not shown schematically) and updating area information 111 prepared in advance as an input and outputs a most recent background image 112. Here, the updating area information is information indicating an area for which updating is performed (updating area) and an area for which updating is not performed (non-updating area) in the generated background image corresponding to the captured image. In the following, each function unit is explained.

The image obtaining unit 101 receives the plurality of captured images 110 and outputs to the background image generation unit 103. The number of captured images used for the generation of the background image by the background image generation unit 103 will be described later. The area information obtaining unit 102 receives the updating area information 111 and outputs to the background image generation unit 103. The background image generation unit 103 performs updating processing for the captured image input from the image obtaining unit 101, the updating area information 111 input from the area information obtaining unit 102, and the background image stored in the background image storage unit 104. The background image generation unit 103 outputs the updated background image from the image processing apparatus 100 as the most recent background image 112 as well as outputting the updated background image to the background image storage unit 104. The background image storage unit 104 stores the background image input from the background image generation unit 103 and outputs to the background image generation unit 103 as the background image to be taken as a reference used for the above-described updating processing. Then, in a case where updating processing is performed by the background image generation unit 103, the background image storage unit 104 receives and stores the new updated background image obtained by the updating processing.

Figure 2:
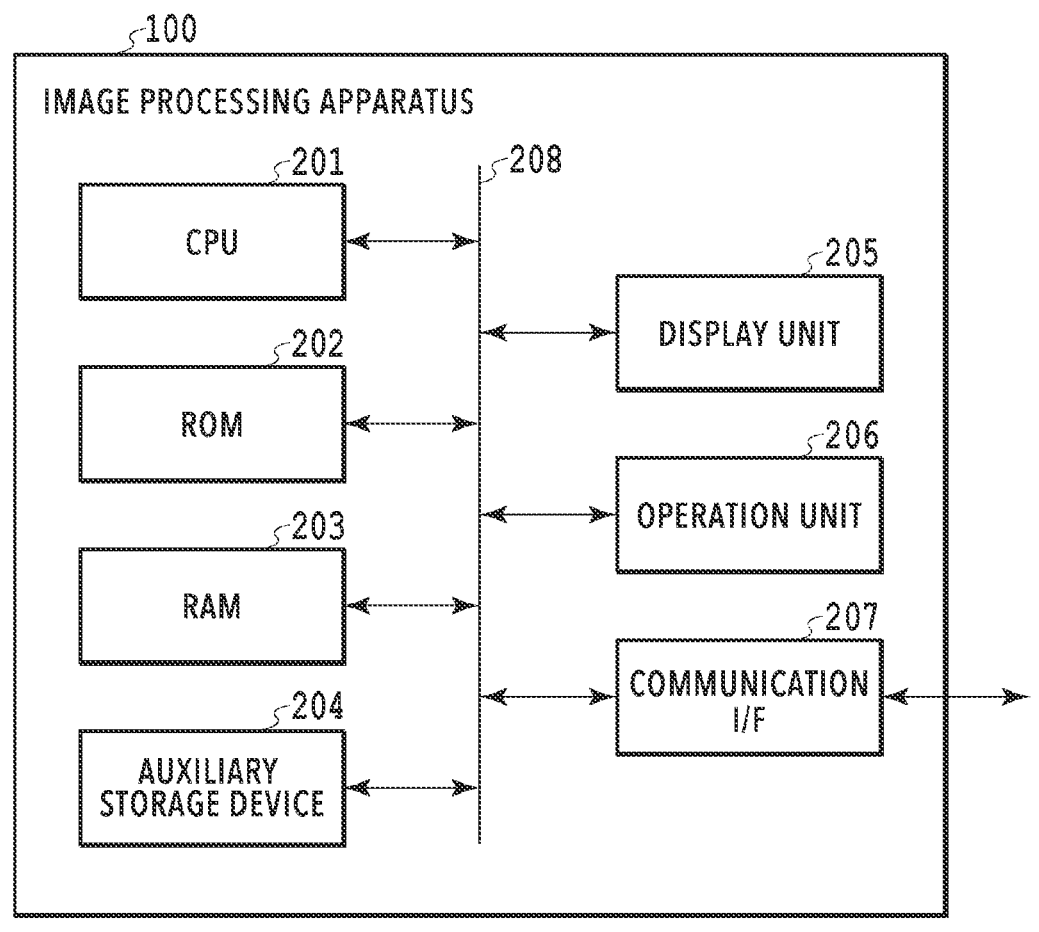
FIG. 2 is a diagram showing a hardware configuration of the image processing apparatus.

Next, the hardware configuration of the image processing apparatus 100 is explained by using FIG. 2. The image processing apparatus 100 has a CPU 201, a ROM 202, a RAM 203, an auxiliary storage device 204, a display unit 205, an operation unit 206, a communication I/F 207, and a bus 208. The CPU 201 controls the whole of the image processing apparatus 100 by using computer programs and data stored in the ROM 202 and the RAM 203 and implements each of the above-described function units. It may also be possible for the image processing apparatus 100 to have one or a plurality of pieces of dedicated hardware different from the CPU 201 and the dedicated hardware may perform at least part of the processing to be performed by the CPU 201. As examples of the dedicated hardware, there are an ASIC (Application Specific Integrated Circuit), an FPGA (Field Programmable Gate Array), a DSP (Digital Signal Processor) and the like. The ROM 202 stores programs and the like that do not need to be changed. The RAM 203 temporarily stores programs and data supplied from the auxiliary storage device 204, data supplied from the outside via the communication I/F 207, and the like. The auxiliary storage device 204 includes, for example, a hard disk drive or the like and stores various types of data. In the RAM 203 and the auxiliary storage device 204, intermediate data generated in updating, various types of setting information and the like are stored, in addition to various types of data, such as the plurality of captured images 110, the updating area information 111, and the most recent background image 112 in FIG. 1, and generated background images stored for updating. The display unit 205 includes, for example, a liquid crystal display, an LED or the like and displays a GUI (Graphical User Interface) for a user to operate the image processing apparatus 100, and the like. The operation unit 206 includes, for example, a keyboard, a mouse, a joystick, a touch panel and the like and inputs various instructions to the CPU 201 in response to the operation by a user. The CPU 201 operates as a display control unit configured to control the display unit 205 and an operation control unit configured to control the operation unit 206. The communication I/F 207 is used for communication with an external device of the image processing apparatus 100. For example, in a case where the image processing apparatus 100 is connected with an external device by a wire, a communication cable is connected to the communication I/F 207. In a case where the image processing apparatus 100 has a function to wirelessly communicate with an external device, the communication I/F 207 comprises an antenna. The bus 208 connects each unit of the image processing apparatus 100 and transmits information. In the present embodiment, the display unit 205 and the operation unit 206 exist inside the image processing apparatus 100, but it may also be possible for at least one of the display unit 205 and the operation unit 206 to exist as another device outside the image processing apparatus 100.

<Operation of Image Processing Apparatus>

Figure 3:
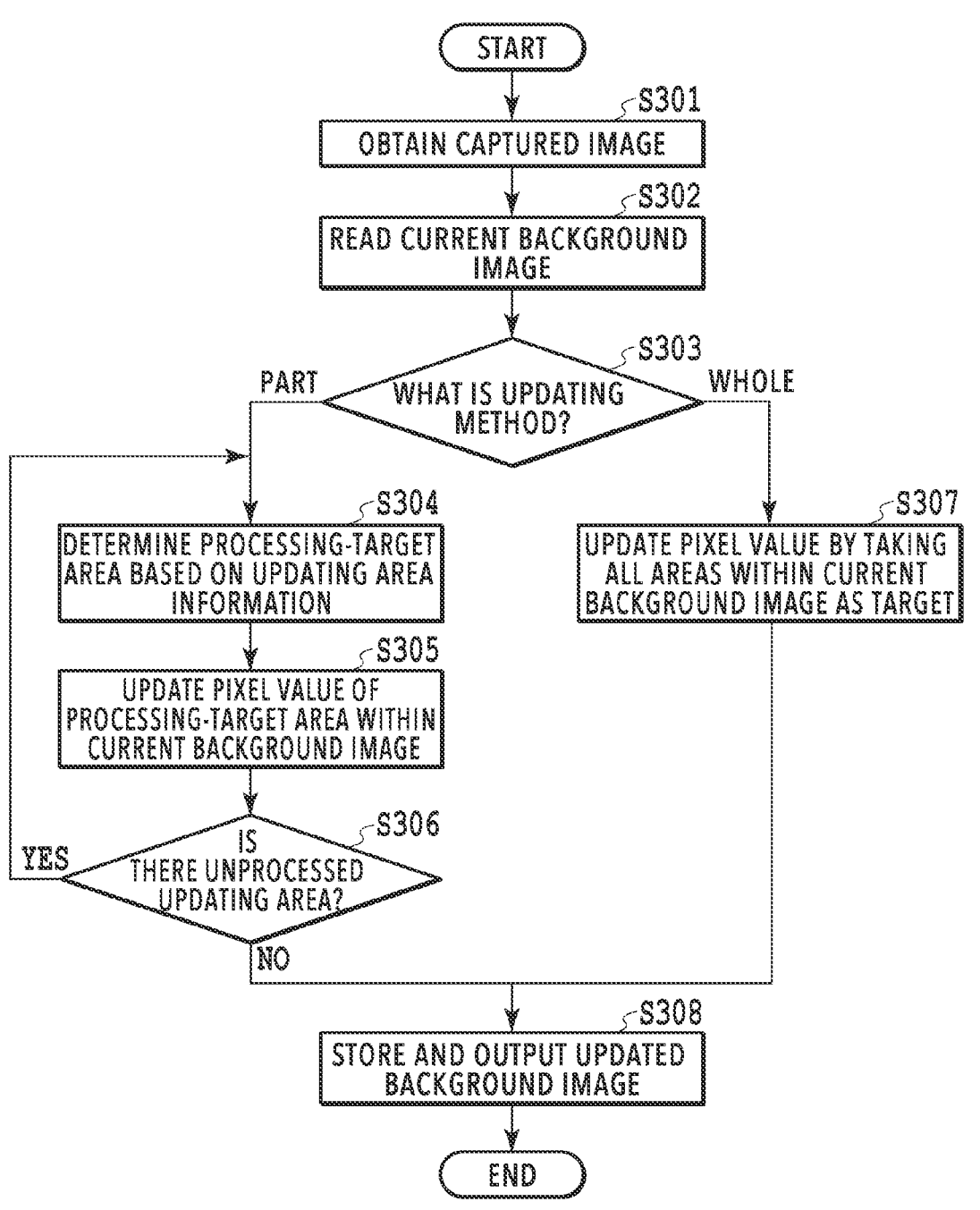
FIG. 3 is a flowchart showing a flow of background image generation processing according to a first embodiment.

Following the above, processing to generate and update a background image according to the present embodiment is explained by using FIG. 3 to FIG. 5A and FIG. 5B. FIG. 3 is a flowchart showing a flow of background image generation processing, FIG. 4A to FIG. 4F and FIG. 5A and FIG. 5B are diagrams explaining the generation method of a background image. Before detailed explanation of the flowchart in FIG. 3 is given, the generation method of a background image in the present embodiment is explained by using the explanatory diagrams in FIG. 4A to FIG. 4F and FIG. 5A and FIG. 5B.

<<Generation Method of Background Image>>

FIG. 4A shows a generated background image 400 in a case where the game of soccer is taken as an image capturing scene. In the background image 400, a field 4001, a goal 4002, and a spectator stand 4003 (in the following, these are together called "background structure") are captured, which are handled as the background. FIG. 4B shows a captured image 410 corresponding to a certain time t during the game. In the captured image 410, in addition to the background structure shown in FIG. 4A, each object of a keeper 4011, a field player 4021, a ball 4031, and a field player 4041 is captured, which are handled as the foreground. FIG. 4C shows a captured image 420 corresponding to a time t+1, which is captured after a predetermined time elapses from the image capturing time t of the captured image 410. In the captured image 420, the same objects as those in the captured image 410 are captured and reference symbols 4021', 4031', and 4041' with "prime (')" attached indicate that the objects are not captured at the same positions (the objects have moved between the time t and the time t+1). That is, it is meant that between the time t and the time t+1, the keeper 4011 has not moved, but the two field players 4021 and 401 and the ball 4031 have moved. It is possible to obtain a background image by comparing the pixels in a correspondence relationship for a plurality of captured images whose image capturing timing is different, determining the pixel area whose change in the pixel value is less than or equal to a threshold value to be the background, and updating the background image stored in the background image storage unit 104. It is also possible to obtain the background image 400 by capturing the field 4001 in the state where players or ball to be handled as the foreground does not exist, for example, before the start of the game. It may also be possible to start the flowchart in FIG. 3, to be described later, by taking the image captured in a case where there is no foreground object, such as before the start of the game, as the initial background image stored in the background image storage unit 104. In a case where a new background image is generated (updated) by taking the generated background image 400 and the two captured images 410 and 420 corresponding to the certain time t and the time t+1 advancing in time from the time t, respectively, as an input, the following procedures 1 and 2 are performed.

<<Procedure 1>>

Figure 5B:
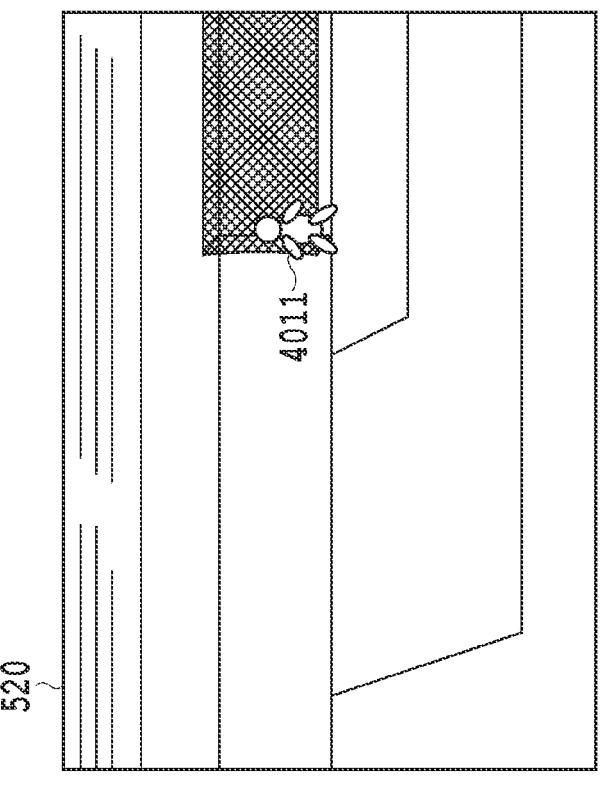
FIG. 5A and FIG. 5B are diagrams explaining a generation method of a background image.
Figure 5A:
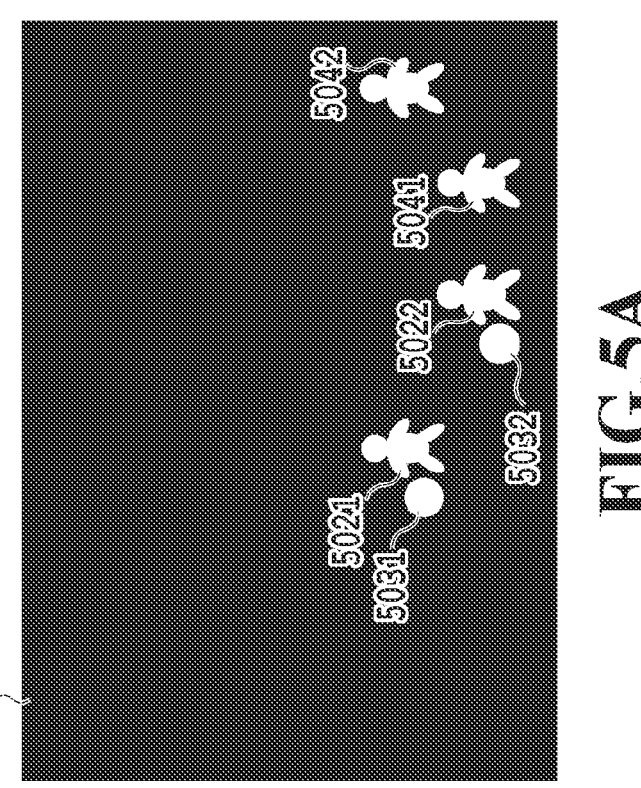

First, between the captured image 410 and the captured image 420, the pixel values at the corresponding pixel positions are compared and the portion in which the difference in the pixel value is less than a certain threshold value and the portion in which the difference is larger than or equal to the threshold value are identified. FIG. 5A shows a binary difference image that is obtained based on the results of the comparison such as this. In a difference image 510 in FIG. 5A, the pixel area in which the difference in the pixel value is less than the threshold value is represented by black (0) and the pixel area in which the difference in the pixel value is larger than or equal to the threshold value is represented by white (1). Here, among all the pixel areas of the captured image 420, in the pixel areas in which the field player 4021, the ball 4031, and the field player 4041 exist in the captured image 410, these objects do not exist. Consequently, for these pixel areas, the difference in the pixel value is determined to be larger than or equal to the threshold value. Then, among all the pixel areas of the captured image 420, the pixel areas in which the difference in the pixel value is determined to be larger than or equal to the threshold value are a difference area 5021, a difference area 5031, and a difference area 5041 represented by white (1) in the difference image 510. Similarly, among all the pixel areas of the captured image 420, in the pixel areas of the field player 4021', the ball 4031', and the field player 4041', these objects do not exist in the captured image 410. Because of this, the pixel areas are a difference area 5022, a difference area 5032, and a difference area 5042 represented by white (1) in the difference image 510.

<<Procedure 2>>

Next, by using the difference image 510 in FIG. 5A, the generated background image 400 in FIG. 4A is updated. Specifically, the portion other than the difference areas in the difference image 510 (=areas in which the difference in the pixel value is less than the predetermined value) is determined to be the background area and the background image 400 is updated by using the pixel values of the pixel areas on the captured image, which correspond to the black pixel areas in the difference image 510. Here, for the updating, whichever of the captured image 410 and the captured image 420 may be used, but generally it is desirable to use the captured image corresponding to the later time. Alternatively, it may also be possible to use the average value of the pixel values of the corresponding pixels in both the captured images. FIG. 5B shows a background image obtained by updating the background image 400 by using the difference image 510. In an updated background image 520 shown in FIG. 5B, the keeper 4011 whose position does not change between the captured images 410 and 420 is taken in as part of the background. That is, it is meant that the generation (updating) of a background image has failed in this case.

An object of the present disclosure is to prevent an object that should originally be handled as the foreground from being taken in in the background image as a result of the object continuing to remain at rest for a predetermined time as in the case described above.

The generation method of a background image is not limited to that described above. For example, it may also be possible to perform the updating of the pixel value of the background image by statistical processing by obtaining and accumulating each pixel value of the captured image for a predetermined period of time. That is, it may also be possible to obtain a distribution of pixel values for a plurality of captured images captured during a predetermined time, classify the plurality of captured images into a plurality of groups including similar pixel values, and take the mean or mode of the group whose frequency of appearance is the highest as the typical value of the pixel value of the background image. In addition, it may also be possible to store in advance the image in an instant in which no object exists as the reference background image and take only the pixel value approximate to the pixel value in the reference background image among the pixel values of a plurality of captured images captured during a predetermined time as the pixel value of the updated background image. Further, it may also be possible to use a combination of these methods in accordance with the features of the image capturing-target object.

<<Operation Flow>>

Next, along the flowchart in FIG. 3, the flow of the background image generation processing in the present embodiment is explained in detail. The flowchart shown in FIG. 3 indicates the flow of specific processing in a case where the background image at a certain time (in a certain frame) is updated and each time the processing of the flowchart is performed, one-time background updating is completed. Then, the frequency of updating is determined in accordance with specifications and the like on the side of the system utilizing the most recent background image 112 (system performing foreground/background separation, performing coloring of a background model, and so on) and the updating is performed at a frequency of updating determined in advance. Further, it is assumed that before the start of the execution of this flow, the updating area information prepared in advance by a user is read from the auxiliary storage device 204 by the area information obtaining unit 102 and loaded onto the RAM 203, and the state where the CPU 201 can refer to the updating area information is brought about. In the following explanation, a symbol "S" means a step.

At S301, the image obtaining unit 101 obtains a plurality of captured images captured during a predetermined time. The plurality of captured images to be obtained is images obtained by a certain imaging device performing image capturing under the same image capturing conditions at different times, such as the captured image 410 in FIG. 4B and the captured image 420 in FIG. 4C described previously. Here, "predetermined time" is, for example, about 0.5 to five seconds in a case of the game of sport such as soccer. Here, it is assumed that the number of captured images used for updating processing is two. In a case where the frame rate of the imaging device is 60 fps and "predetermined time" is five seconds, from among captured images corresponding to 300 frames obtained during five seconds, two captured images are obtained, that is, for example, the captured image of the 0th frame and the captured image of the 299th frame. The number of captured images to be obtained may be three or more. The larger the number of captured images, the more surely it is possible to prevent the occurrence of a situation in which an object that happens to remain at rest for a predetermined time is taken in in the background. Further, in a case where "predetermined time" is determined, it may also be possible to take into consideration the moving speed of the image capturing-target object. For example, it may also be possible to set a time interval at which objects do not overlap from the average size and the moving speed of the object. However, even in a case where a predetermined time is set appropriately with the consideration such as this, it is not possible to completely prevent an object continuing to remain at rest for a long time from being taken in in the background image. Further, it may happen that a structure or the like existing within the image capturing space deforms or moves during the period of time of image capturing, and therefore, it is necessary to perform the updating of the whole background image periodically at a time interval longer than the above-described "predetermined time".

Each step at next S302 to S307 is performed by the background image generation unit 103. First, at S302, the updating-target background image is read from the background image storage unit 104. As described previously, the updating-target background image is the current background image stored in the background image storage unit 104 (which is generated by the most recent updating processing). Here, it is assumed that the background image 400 shown in FIG. 4A is read, in which only the background structure is captured.

At S303, depending on whether or not the setting to perform updating by taking only part of the background image as a target (in the following, called "partial updating") is performed, whether S304 is performed or S307 is performed is determined (branching step). Here, whether to perform partial updating is set in advance based on user instructions via a UI screen (not shown schematically) on which it is possible to, for example, select to perform or not to perform the partial updating. Then, at this step, control is performed to determine the step to be performed next by referring to flag information indicating whether or not to perform partial updating, which is set based on user instructions. In a case where the partial updating is performed, S304 is performed next and in a case where the partial updating is not performed, S307 is performed next.

At S304 in a case where the partial updating is performed, the area that is taken to be the target of updating processing (processing-target area) in the current background image read from the background image storage unit 104 is determined based on updating area information. Here, by taking the case of the background image 400 as an example, the way the processing-target area is determined is explained. As described previously, in the captured image 410 corresponding to the time t shown in FIG. 4B and the captured image 420 corresponding to the time t+1 shown in FIG. 4C, the field players 4021 and 4041 and the ball 4031, which are moving, and the keeper 4011 at rest exist in a mixed manner. Consequently, updating area information is created in advance so that background updating is not performed for the area in which the possibility that the keeper 4011 continues to remain at rest is strong and background updating is performed for the area not including the goal 4002 in order to prevent the keeper 4011 at rest from being taken in in the background image. FIG. 4D is a diagram showing one example of a binary mask image as updating area information. A mask image 430 in FIG. 4D includes an updating area 431 indicated by hatching and a non-updating area 432 without hatching. Then, FIG. 4E is a diagram showing the area within the captured image 410, which corresponds to the updating area 431, by a solid-line frame 411 and FIG. 4F is a diagram showing the area within the captured image 410, which corresponds to the non-updating area 432, by a broken-line frame 412.

The updating area information only needs to be capable of identifying the updating area and the non-updating area in the background image and the format is not limited to the mask image. For example, the updating area information may be two-dimensional coordinate information capable of identifying the updating area and the non-updating area, respectively. Further, in the example of the mask image 430 in FIG. 4D, there is one non-updating area, but there may be a plurality of non-updating areas. As a case where there is a plurality of non-updating areas, for example, a case is considered where the positions at which there is comparatively slight movement, such as the positions of an umpire, a catcher and the like in the game of baseball, are interspersed within the captured image. At this step, based on the updating area information such as this, the processing-target area in the current background image is determined, for which the updating of the pixel value is performed.

At S305, for the processing-target area determined at S304, the background updating applying the background image generation method described previously is performed. Due to this, only the pixel value of the pixel belonging to the processing-target area in the current background image is updated.

At S306, whether or not the updating processing is completed for all the updating areas identified by the updating area information is determined. In a case where there is an unprocessed updating area, the processing returns to S304, and the next processing-target area is determined and the processing is continued. On the other hand, in a case where the updating processing is completed for all the updating areas indicated by the updating area information, S308 is performed next.

At S307 in a case where the partial updating is not performed, the updating processing applying the background image generation method described previously is performed by taking all the areas in the current background image read from the background image storage unit 104 as the processing-target area. Due to this, the pixel value of each pixel configuring all the areas in the current background image is updated as needed.

At S308, the background image generation unit 103 outputs the updated background image obtained by the processing up to this point as the most recent background image 112. Further, the updated background image is also output to the background image storage unit 104 and stored in the background image storage unit 104 in preparation for the next updating processing. The above is the contents of the background image generation processing of the present embodiment.

Modification Example 1

At timing at which no object at rest exists, it is appropriate to perform the updating processing by taking all the areas in the background image as the target. For example, in the example of soccer described previously, at timing at which the keeper 4011 is not at rest in front of the goal 4002, such as a case where the keeper 4011 plays while moving at a position distant from the goal 4002, the keeper 4011 is not taken in in the background even in a case where the partial updating is not performed. Consequently, for example, it may also be possible to detect the timing at which a specific object having a possibility of remaining at rest during a predetermined time does not exist within the updating area by image analysis, such as object detection, or in a case of real-time processing, it may also be possible for an operator to perform determination by seeing the image capturing situation. Then, in a case where the specific object does not exist within the updating area, it may also be possible to change the setting dynamically so as to perform the whole updating in place of the partial updating.

Modification Example 2

Figures 6A, 6B, 6C, 6D, 6E, 6F:
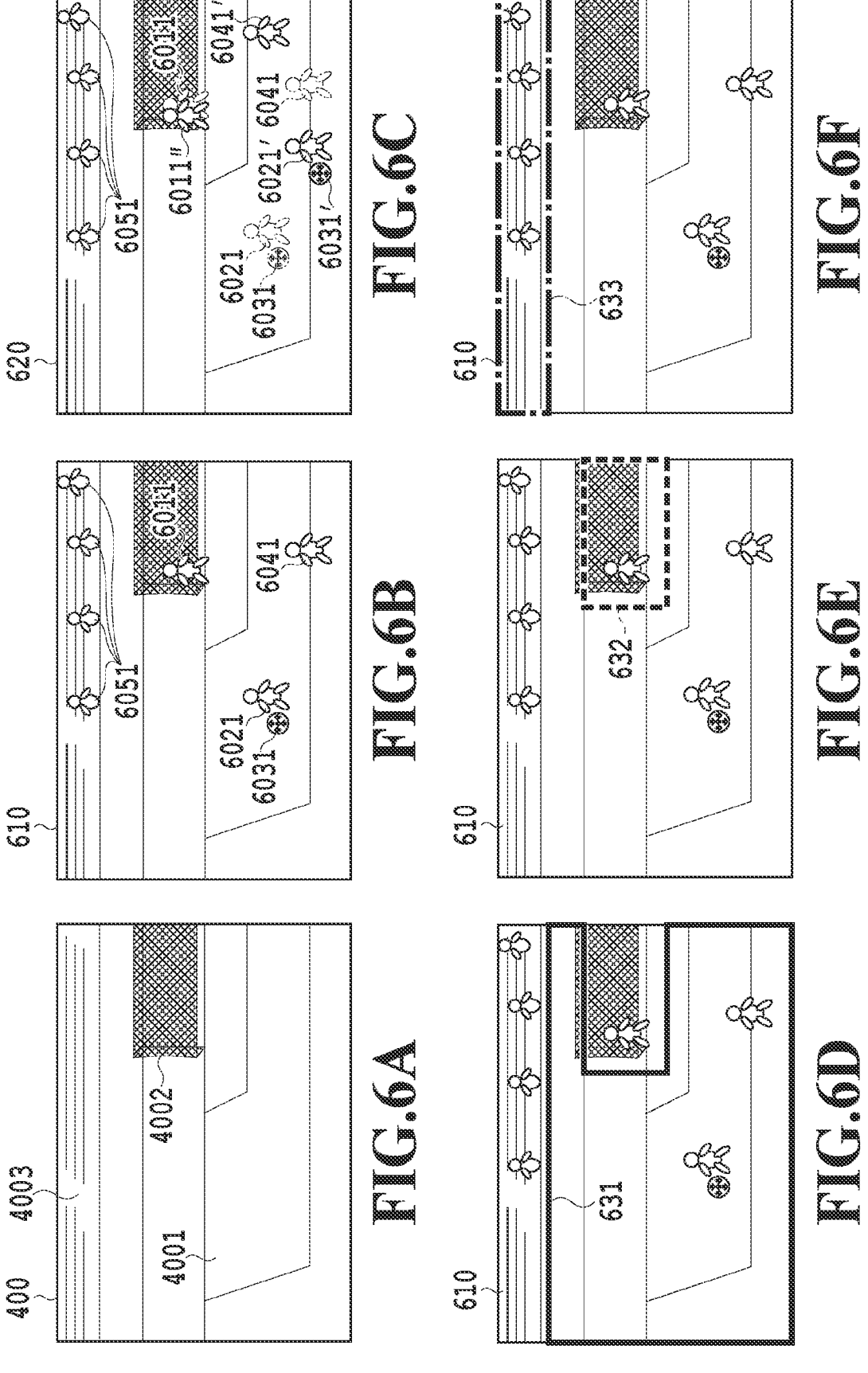
FIG. 6A to FIG. 6F are diagrams explaining an application example of a modification example 2.

It may also be possible to perform the background updating by a different method in accordance with the type of object for the image area in which the possibility that the object who moves during a predetermined time exists is strong. FIG. 6A to FIG. 6F are diagrams explaining the application example of the present modification example. FIG. 6A is the same diagram as that in FIG. 4A described previously and shows the background image in which no foreground object is captured and only the background structures (4001 to 4003) are captured. FIG. 6B shows a captured image 610 corresponding to a certain time t during the game. Here, in the captured image 610, each foreground object of a keeper 6011, a field player 6021, a ball 6031, and a field player 6041 is captured. Further, in the spectator stand 4003 in the captured image 610, four spectators 6051 are captured. FIG. 6C shows a captured image 620 corresponding to a time t+1, which is captured after a predetermined time elapses from the image capturing of the captured image 610. In the captured image 620, the same objects as those in the captured image 610 are captured and each of objects indicated by reference symbols 6021', 6031', and 6041' with "prime (')" attached has moved during from the time t to the time t+1 by an amount corresponding to the whole body or more. Further, an object indicated by a reference symbol 6011" with "double prime (")" attached has moved during from the time t to the time t+1 by an amount corresponding to about half the whole body. Then, the spectators 6051 are captured at the same positions both in the captured image 610 and in the captured image 620. That is, the spectators 6051 are at rest during from the time t1 to the time t+1.

In the present modification example, the updating method of each area in the background image is determined based on the type of object captured in the captured image. First, the area in which the possibility that only the type of object whose moving speed is high exists is strong is set as an area (short-time updating area) for which the background updating is performed with a relatively short time (for example, 0.5 seconds) as "predetermined time" at S301. On the other hand, the area in which the possibility that the type of object whose moving speed is low exists is strong is set as an area (long-time updating area) for which the background updating is performed with a relatively long time (for example, 5.0 seconds) as "predetermined time" at S301. Further, the area in which the possibility that the object at rest or the object that can be regarded as the object at rest (whose moving speed is substantially zero) exists is strong is set as an area (non-updating area) for which the background updating is not performed. In the application example described above, a solid-line frame 631 in FIG. 6D indicates the area within the captured image 610, which corresponds to the short-time updating area, and a broken-line frame 632 in FIG. 6E indicates the area within the captured image 610, which corresponds to the long-time updating area. Further, a one-dot chain-line frame 633 in FIG. 6F indicates the area within the captured image 610, which corresponds to the non-updating area.

Figure 7:
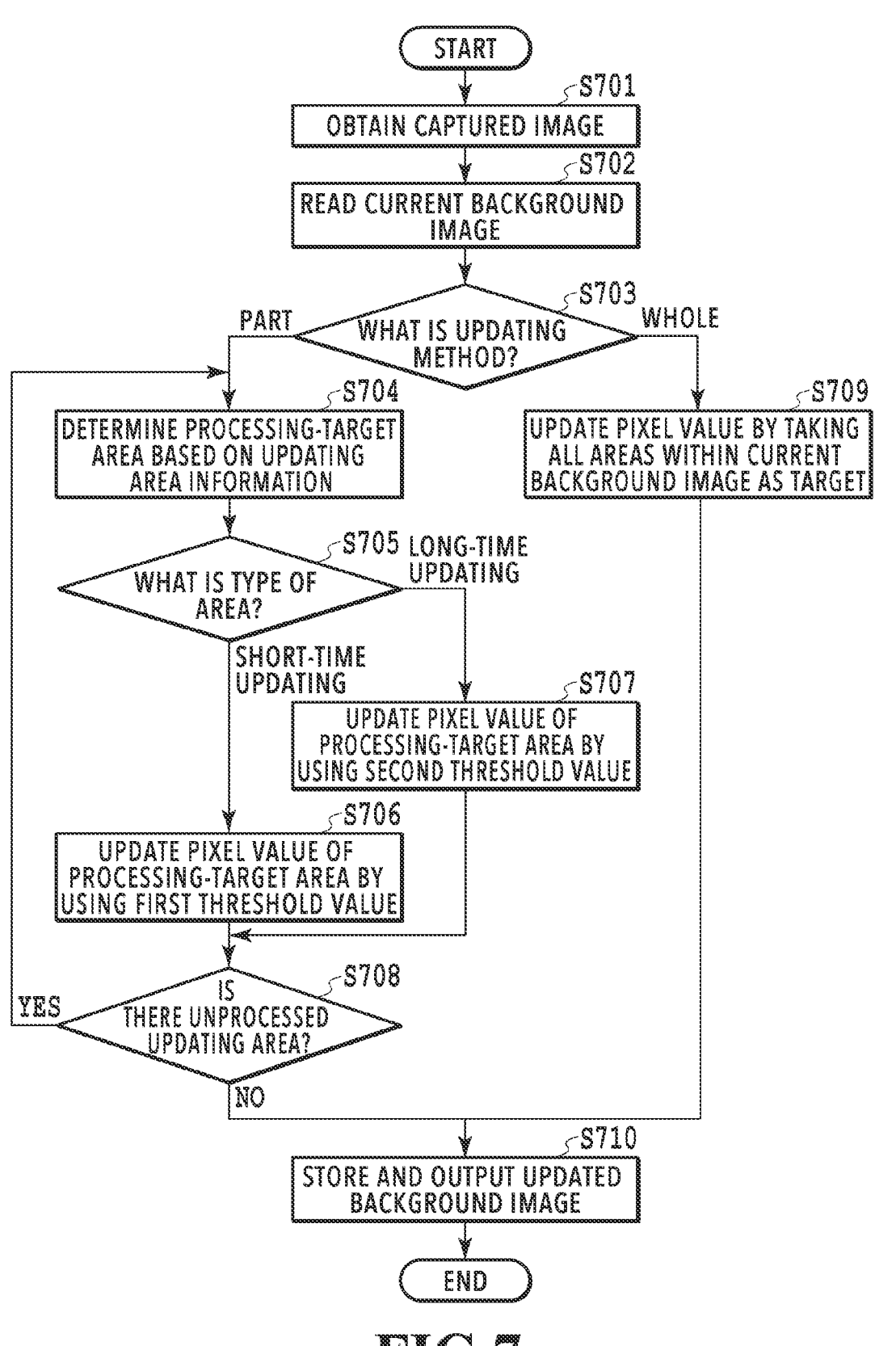
FIG. 7 is a flowchart showing a flow of background image generation processing according to the modification example 2.

In the present modification example, updating area information capable of identifying these three types of area is prepared in advance and read before the start of the updating processing of the background image. FIG. 7 is a flowchart showing a flow of the background image generation processing according to the present modification example. In the following, along the flowchart in FIG. 7, the background image generation processing according to the present modification example is explained.

At S701, at timing of the predetermined time set for the short-time updating area and at timing of the determined time set for the long-time updating area, respectively, a plurality of captured images for the short-time updating area and a plurality of captured images for the long-time updating area are obtained.

Each step of S702 to S704 is the same as S302 to S304 in the flowchart in FIG. 3 described above, and therefore, explanation is omitted. In a case where the updating-target area within the background image is determined based on the updating area information at S704, at next S705, processing to allocate the updating method depending on whether the determined updating-target area is the short-time updating area or the long-time updating area is performed (branching step). Specifically, in a case where the updating-target area is the short-time updating area, S706 is performed next and in a case where the updating-target area is the long-time updating area, S707 is performed next.

At S706, by using the plurality of captured images obtained at short time intervals at S701, the background updating is performed for the processing-target area determined at S704, which applies the background image generation method capable of taking in the change in the background portion due to the elapse of time or deformation in the background image comparatively quickly. In a case of the short-time updating area, the supposed object is an object whose moving speed is high and/or whose movement amount is large, and therefore, the possibility that part of the object overlaps another between the comparison-target captured images is also faint. Consequently, the generation method is applied in which, for example, the difference value (threshold value) with which the presence/absence of a change in the pixel value is detected is set relatively small.

At S707, by using the plurality of captured images obtained at long time intervals at S701, the background updating is performed for the processing-target area determined at S704, which applies the background image generation method capable of taking in the change in the background portion due to the elapse of time or deformation in the background image comparatively slowly. In a case of the long-time updating area, the supposed object is an object whose moving speed is slow and/or whose movement amount is small, and therefore, the possibility that part of the object overlaps another between the comparison-target captured images is also strong. Consequently, the generation method is applied in which, for example, the difference value (threshold value) with which the presence/absence of a change in the pixel value is detected is set relatively large Each step of S708 to S710 is the same as S306 to 308 in the flowchart in FIG. 3 described above, and therefore, explanation is omitted. It may also be possible to combine the present modification example with the modification example 1 described above.

Modification Example 3

In the embodiment described above, explanation is given on the assumption that the updating area information is prepared in advance by a user or the like in accordance with the image capturing scene, but for example, it may also be possible to dynamically generate updating area information based on the change in the pixel value of each pixel configuring the captured image. In the following, a method in a case where updating area information is generated dynamically is explained.

Figures 8A, 8B:
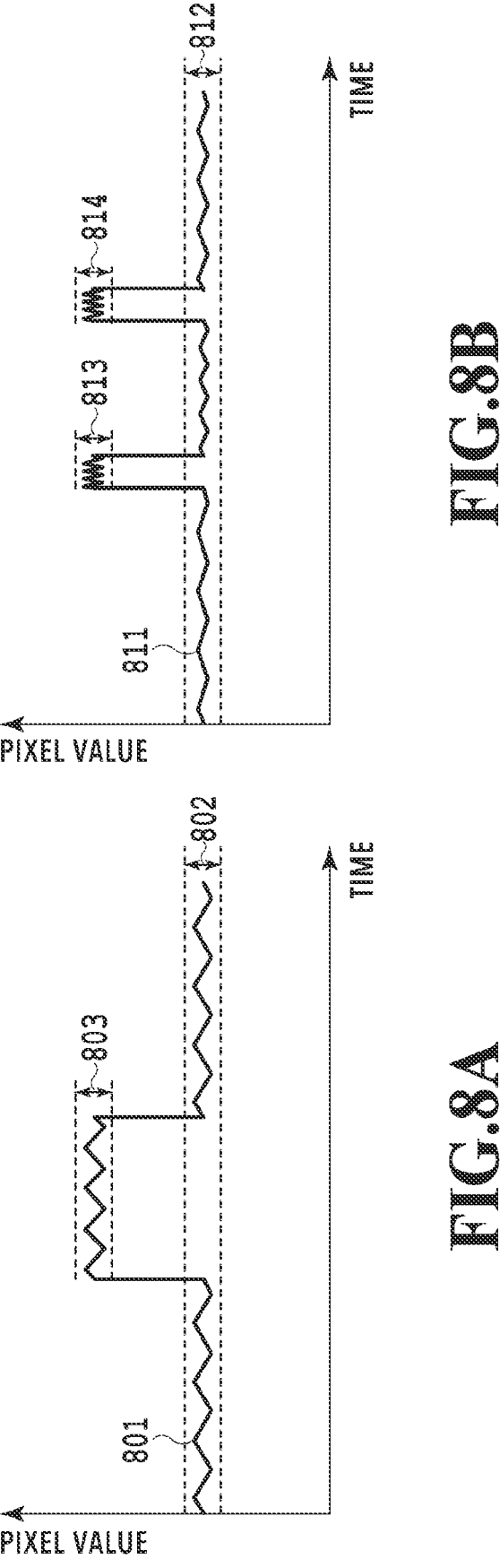
FIG. 8A and FIG. 8B are diagrams explaining a modification example 3.

FIG. 8A and FIG. 8B are each a graph in which the vertical axis represents the pixel value (in a case of eight bits, "0 to 255") and the horizontal axis represents time (second), showing a change in the pixel value in a certain pixel within a captured image during a predetermined time (for example, several tens of seconds). Here, the pixel value is, for example, each component value (R value, G value, B value) in the captured image represented in the RGB color space or the average value thereof. FIG. 8A corresponds to an object whose moving speed is comparatively slow and FIG. 8B corresponds to an object whose moving speed is comparatively high. Then, a two-directional arrow 802 in FIG. 8A and a two-directional arrow 812 in FIG. 8B indicate the range of the pixel value representing the original background color and a two-directional arrow 803 in FIG. 8A and two-directional arrows 813/814 in FIG. 8B indicate the range of the pixel value representing a color other than the background color.

In a case where the moving speed of the object is slow, as indicated by a solid line 801 in FIG. 8A, the period of time during which the pixel value represents a color other than the background color becomes comparatively long and the frequency of appearance of the period of time per unit time becomes low. In contrast to this, in a case where the moving speed of the object is high, as indicated by a solid line 811 in FIG. 8B, the period of time during which the pixel value represents a color other than the background color becomes comparatively short and the frequency of appearance of the period of time per unit time becomes high. Consequently, for the captured images obtained in a time series, the trend of the change in the pixel value per unit time is analyzed, and then, the area including the pixel group close to the solid line 801 in FIG. 8A is determined to be the long-time updating area and the area including the pixel group close to the solid line 811 in FIG. 8B is determined to be the short-time updating area. Due to this, it is possible to obtain the updating area information automatically.

In a case of the present modification example, irrespective of the type of object, it is possible to generate a background image in which an object that remains at rest for a predetermined time is not taken in. It is needless to say that the color space of a captured image is not limited to the RGB color space and another image format may be acceptable.

As above, according to the present embodiments including each modification example, even in a case where an object remains at rest for a predetermined time in part of the area in a captured image, it is possible to generate and update a background image without the object being taken in in the background.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, in generating a background image from a plurality of captured images obtained during a predetermined time, even in a case where a predetermined time elapses without any change in the state where an object remains at rest, it is possible to generate a background image in which the area of the object is not taken in.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-033506, filed Mar. 6, 2023, which is hereby incorporated by reference wherein in its entirety.

What is claimed is:

1. An image processing apparatus for generating a background image from a plurality of captured images obtained during a predetermined time, the image processing apparatus comprising:

one or more memories storing instructions; and one or more processors executing the instructions to perform:

obtaining the plurality of captured images;

obtaining area information indicating an updating area, which is a target of updating processing, and a non-updating area, which is not a target of updating processing, for the background image; and generating a new background image by performing updating processing based on the plurality of captured images, which takes the updating area identified by the area information among the generated background images corresponding to the plurality of captured images as a target, wherein the updating processing is processing to compare pixels in a correspondence relationship included in a target area of the updating processing for the plurality of captured images and change a pixel value of a corresponding pixel in the generated background image for a pixel whose difference in a pixel value is less than or equal to a threshold value, in the area information, a first updating area corresponding to a first type of object whose moving speed is relatively high and a second updating area corresponding to a second type of object whose moving speed is relatively slow are included, the predetermined time during which the plurality of captured images used for updating processing for the first updating area is obtained is shorter than the predetermined time during which the plurality of captured images used for updating processing for the second updating area is obtained, and the threshold value used for updating processing for the first updating area is smaller than the threshold value used for updating processing for the second updating area.

2. The image processing apparatus according to claim 1, wherein the one or more processors further execute the instructions to perform:

setting whether to perform updating processing using the area information and in a case where setting to perform updating processing using the area information is performed, a new background image is generated by performing updating processing for the updating area.

3. The image processing apparatus according to claim 2, wherein the one or more processors further execute the instructions to perform:

displaying a UI screen on a display for a user to give instructions to perform the setting and the setting is performed based on user instructions via the UI screen.

4. The image processing apparatus according to claim 3, wherein before obtaining the plurality of captured images is started, the setting is performed based on user instructions given via the UI screen.

5. The image processing apparatus according to claim 3, wherein after obtaining the plurality of captured images is started, the setting is performed based on user instructions given via the UI screen on which the obtained plurality of captured images is displayed.

6. The image processing apparatus according to claim 2, wherein the one or more processors further execute the instructions to perform:

detecting whether there exists a specific object within the updating area identified by the area information on the obtained plurality of captured images and in a case where the specific object is not detected, setting not to perform updating processing using the area information is performed.

7. The image processing apparatus according to claim 2, wherein in a case where setting to perform updating processing using the area information is not performed, a new background image is generated by performing updating processing based on the plurality of captured images, which takes all areas of the generated background image as a target.

8. The image processing apparatus according to claim 1, wherein the one or more processors further execute the instructions to perform:

storing the generated background image; and generating the new background image from the stored generated background image.

9. The image processing apparatus according to claim 1, wherein the updating processing is processing to obtain and accumulate each pixel value of the plurality of captured image for a predetermined period of time and change a pixel value in the generated background image by statistical processing.

10. The image processing apparatus according to claim 1, wherein the updating processing is processing to obtain a distribution of pixel values for the plurality of captured images, classify the plurality of captured images into a plurality of groups including similar pixel values, and take a mean or a mode of a group whose frequency of appearance is the highest as a pixel value of the new background image.

11. The image processing apparatus according to claim 1, wherein the updating processing is processing to store an image in advance in an instant in which no object exists as a reference background image and take only a pixel value approximate to a pixel value in the reference background image among pixel values of the plurality of captured images as a pixel value of an updated background image.

12. The image processing apparatus according to claim 1, wherein the one or more processors further execute the instructions to perform:

obtaining the area information by generating the area information based on a change in a pixel value of each pixel of the plurality of captured images.

13. The image processing apparatus according to claim 1, wherein the area information is a mask image representing the updating area and the non-updating area by two values.

14. An image processing method for generating a background image from a plurality of captured images obtained during a predetermined time, the image processing method comprising the steps of:

obtaining the plurality of captured images;

obtaining area information indicating an updating area, which is a target of updating processing, and a non-updating area, which is not a target of updating processing, for the background image; and generating a new background image by performing updating processing based on the plurality of captured images, which takes the updating area identified by the area information among the generated background images corresponding to the plurality of captured images as a target, wherein the updating processing is processing to compare pixels in a correspondence relationship included in a target area of the updating processing for the plurality of captured images and change a pixel value of a corresponding pixel in the generated background image for a pixel whose difference in a pixel value is less than or equal to a threshold value, in the area information, a first updating area corresponding to a first type of object whose moving speed is relatively high and a second updating area corresponding to a second type of object whose moving speed is relatively slow are included, the predetermined time during which the plurality of captured images used for updating processing for the first updating area is obtained is shorter than the predetermined time during which the plurality of captured images used for updating processing for the second updating area is obtained, and

the threshold value used for updating processing for the first updating area is smaller than the threshold value used for updating processing for the second updating area.

15. A non-transitory computer readable storage medium storing a program for causing a computer to perform an image processing method for generating a background image from a plurality of captured images obtained during a predetermined time, the image processing method comprising the steps of:

obtaining the plurality of captured images;

obtaining area information indicating an updating area, which is a target of updating processing, and a non-updating area, which is not a target of updating processing, for the background image; and generating a new background image by performing updating processing based on the plurality of captured images, which takes the updating area identified by the area information among the generated background images corresponding to the plurality of captured images as a target, wherein the updating processing is processing to compare pixels in a correspondence relationship included in a target area of the updating processing for the plurality of captured images and change a pixel value of a corresponding pixel in the generated background image for a pixel whose difference in a pixel value is less than or equal to a threshold value, in the area information, a first updating area corresponding to a first type of object whose moving speed is relatively high and a second updating area corresponding to a second type of object whose moving speed is relatively slow are included, the predetermined time during which the plurality of captured images used for updating processing for the first updating area is obtained is shorter than the predetermined time during which the plurality of captured images used for updating processing for the second updating area is obtained, and the threshold value used for updating processing for the first updating area is smaller than the threshold value used for updating processing for the second updating area.

* * * * *